Patented Sept. 27, 1932

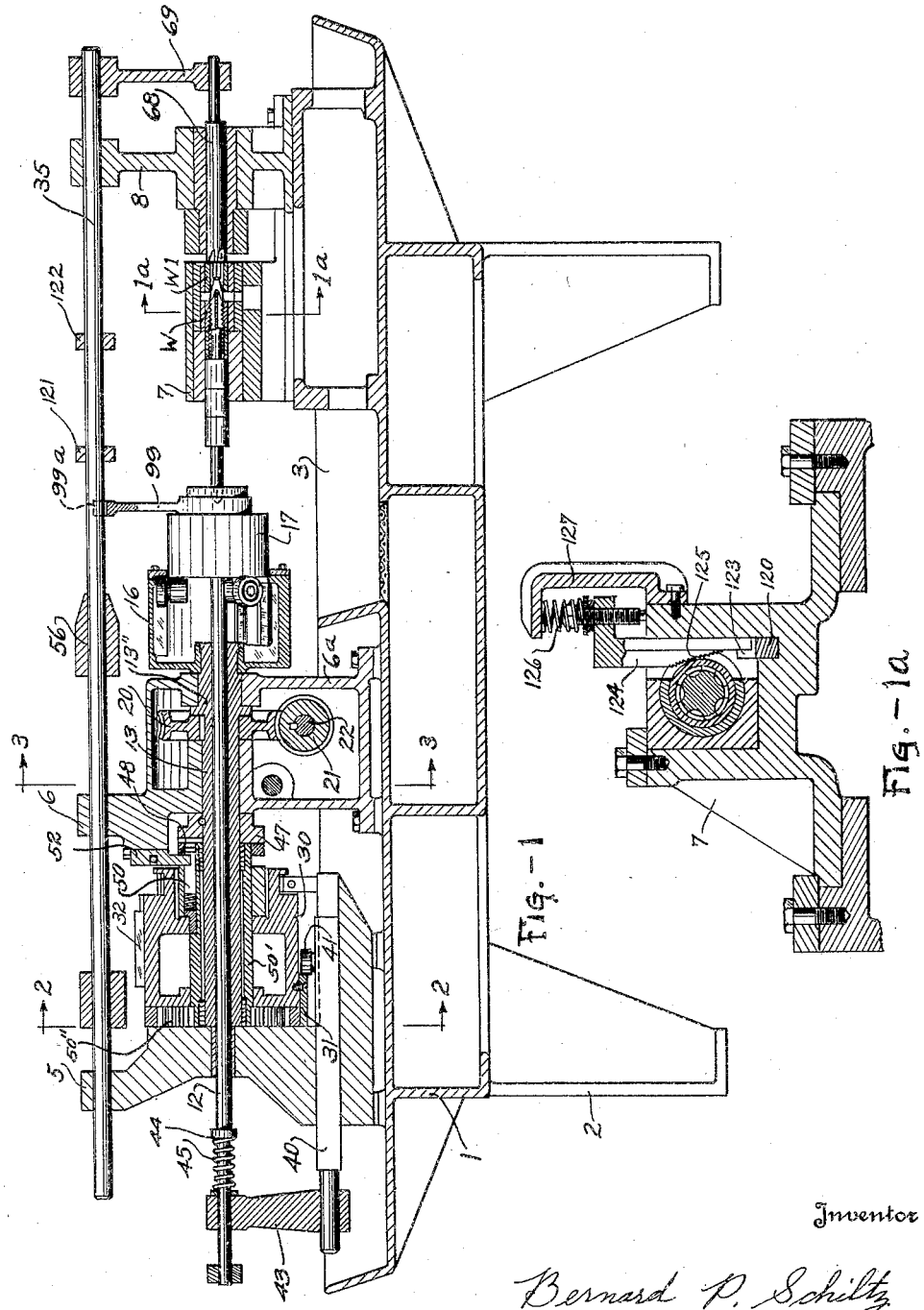

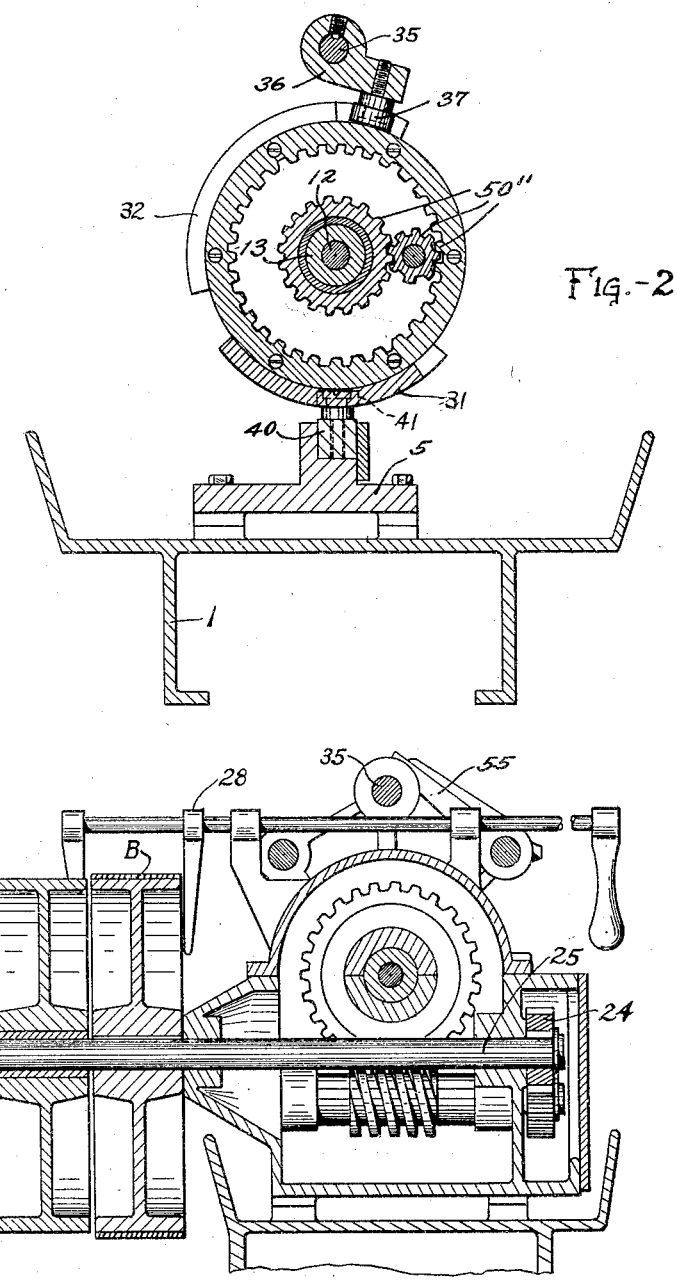

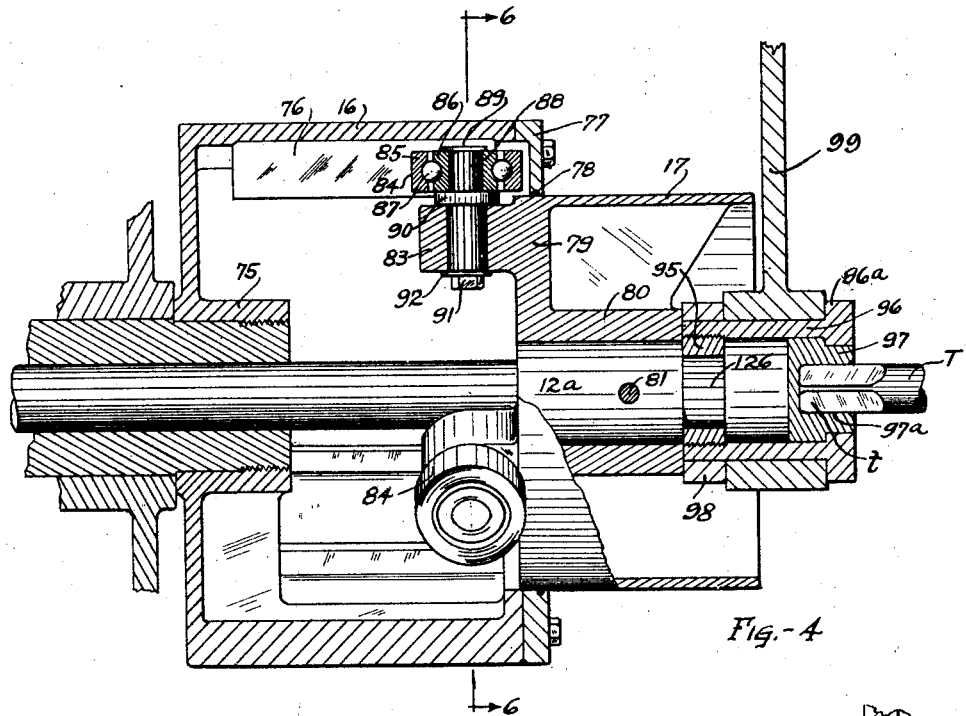
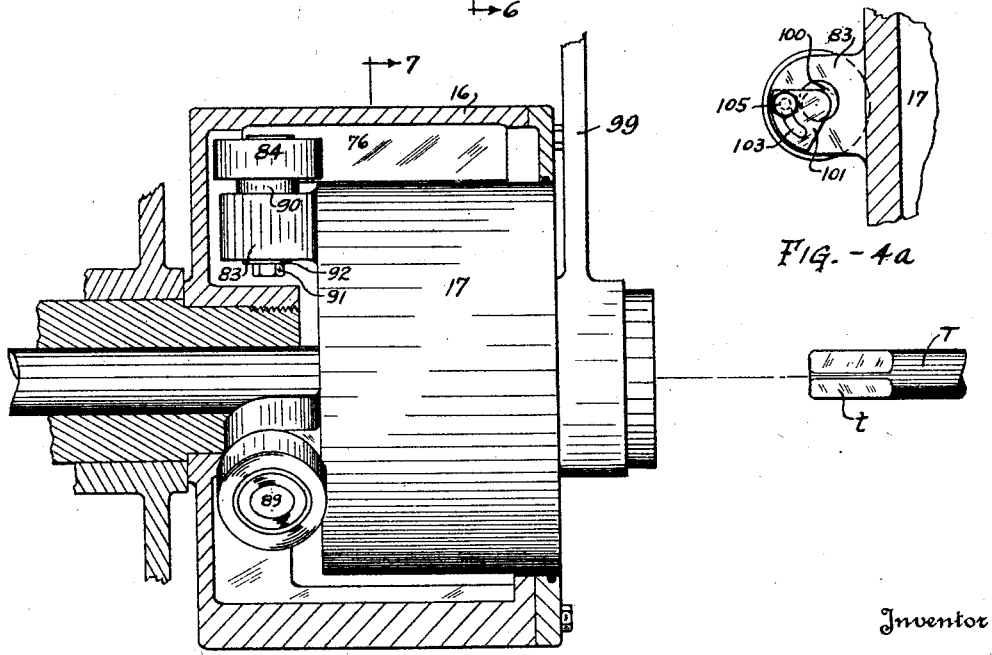

1,879,531

UNITED STATES PATENT OFFICE

BERNARD P. SCHILTZ, OF CLEVELAND, OHIO, ASSIGNOR TO THE FOOTE-BURT COMPANY, OF CLEVELAND, OHIO, A CORPORATION OF OHIO

MACHINE TOOL

Application filed August 22, 1929. Serial No. 387,648.

This invention relates to machines of the type wherein a metal working element, such as a cutting tool, is adapted to move, while performing its work, with reference to a relatively stationary driving mechanism.

The common practice, in such machines, is to provide a splined connection between a tool holder, for example, and the driving head for such holder, to permit the holder to move longitudinally of the head while maintaining a positive driving connection. The main disadvantage of such splined connections result from frictional drag tending to hold the parts against relative longitudinal travel. This is especially detrimental where the tool is working under considerable torque, since in such cases, the friction results in undesirable retardation of the feeding movement of the cutting tool and often in back-scoring or back-cutting of the tool on the work. To illustrate, assuming the machine is adapted to tap threads, and that the work being tapped acts as a lead screw for the tap to advance the tap relative to the work; it is obvious that if the friction between the driving member and the tool holder is such as to cause the retardation of the feed, it will inevitably cause the heel portions of the tap threads to cut or tend to cut rearwardly, thereby forming irregular threads.

Even though the machine is provided with an extraneous guide for advancing the tool, as in an automatic drilling or boring machine, such retardation, due to frictional drag between the holder and driving head, will ultimately cause wear on the guide and the same disadvantage will be present, though usually to a lesser extent. The present invention is, of course, adaptable to such machines.

An object of the invention is to provide mechanism for use in connection with machines such as above mentioned, which will overcome the disadvantages discussed and similar disadvantages.

A further object is to provide a driving connection between driving and driven members adapted to be moved longitudinally relative to each other under load, which connection will practically avoid the disadvantages inherent in the usual splined connection.

A further object is to provide a tapping machine of the kind wherein a driving element for causing relative rotation between the tap and work, has to be moved longitudinally of the power mechanism which drives such element, and wherein the frictional resistance, due to such longitudinal movement, is materially reduced, and, from a practical standpoint, eliminated.

Further objects and features of the invention will become apparent from the following description relating to the accompanying drawings. The essental characteristics will be summarized in the claims.

Figure 6:
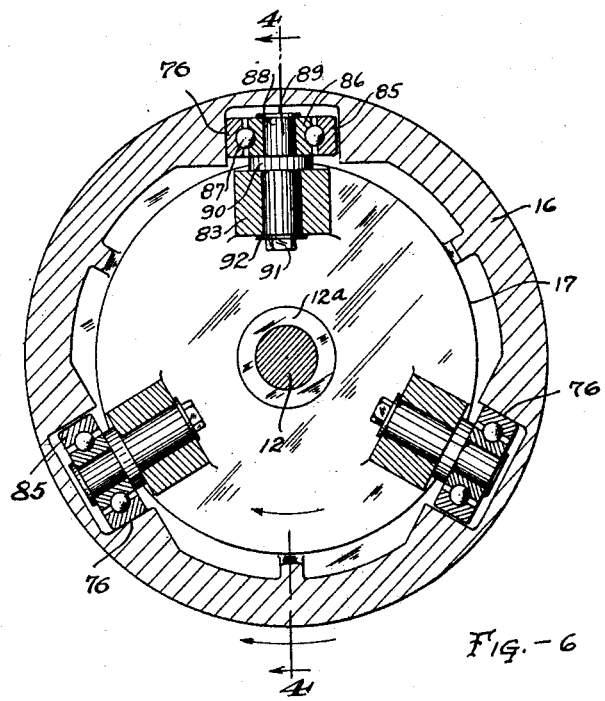
Figure 7:
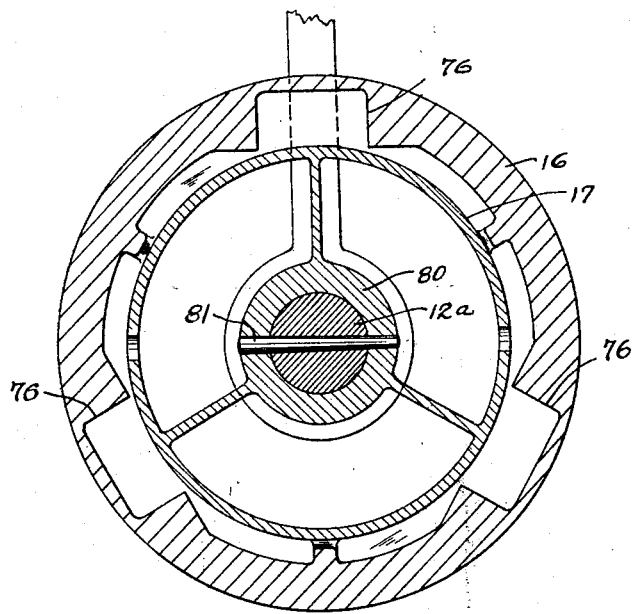

In the drawings, Fig. 1 is a substantially central longitudinal section through a tapping machine of the type shown in the prior patent to Daniel Kelleher, No. 1,645,285, assigned to The Foote-Burt Company, the assignee of the present application; Fig. 1a is a transverse sectional detail view through the work holding parts of the machine, as indicated by the line 1a—1a on Fig. 1; Figs. 2 and 3 are transverse cross sectional views taken along corresponding sectional indicating lines on Fig. 1; Fig. 4 is a detail cross sectional view of a tool driving head mechanism, the section being taken substantially along the line 4—4 on Fig. 6; Fig. 4a is a detail view of a modification in the head mechanism; Fig. 5 is a cross sectional view similar to Fig. 4, showing a different relationship of parts comprised in the head mechanism, and Figs. 6 and 7 are transverse cross sectional views of the main parts of the head mechanism, as indicated by the lines 6—6 and 7—7 on Figs. 4 and 5 respectively.

The tapping machine shown in the drawings is to be taken largely as an example of the kind of machines with which the invention is most readily adapted for use, but except as specified in the claims, the invention is not to be considered as confined to tapping machine.

The tapping machine shown is entirely automatic and a sufficient number of parts are illustrated to bring out the automatic features. In general, the machine comprises a spindle and spindle head, including suitable driving mechanism for longitudinally shifting the spindle and along with it a suitable chuck, arranged to engage and disengage the tap. The spindle, as shown, is arranged to be constantly rotated, but the tap is intermittently driven, because part of the time it is released from the chuck. The tap, as shown, is supported in engagement with the work, and the work blanks, shown as cylindrical couplings to be internally threaded, are ultimately fed over the entire length of the tap and the complete threaded couplings are discharged from the tap while the chuck is disengaged therefrom. Any suitable means may be used to feed couplings or blanks to the work holder and likewise, to hold at least one of the blanks in stationary position in the holder and against turning, such for example, as found in the prior Kelleher patent.

In machines of this particular type, considerable trouble has been experienced where the driving mechanism (power driven gearing and spindle head, for example), is stationary, while the device carrying the tool has to be axially moved, as in order to move with the tool as the latter feeds with reference to the work. The primary reason for such trouble has been discussed. I propose to provide an arrangement which may be substituted for the usual splined connection, as between a stationary driving mechanism and axially shiftable tool holder, which will permit the axial shifting to be accomplished substantially without frictional drag, and at the same time and by the same arrangement, I provide for materially decreasing the power required to drive the tool under a given load, and am thereby enabled to lessen tool breakage.

Referring to the drawings, the machine shown comprises a suitable bed 1 having supporting legs 2, an oil pan 3 and various upwardly extending brackets supporting the machine parts which rise from the bed. There are brackets 5 and 6 comprised in the spindle head of the machine, a bracket 7 supporting the work holder and, at least partially, the tap, and a bracket 8 supporting part of a control mechanism and a work feeding mechanism.

The spindle head mechanism, carried by the brackets 5 and 6, comprises a central spindle shaft 12, a chuck device or head 17, and a constantly driven spindle sleeve 13, having thereon a chuck driving head 16. The arrangement of parts 16 and 17 shown, is such that the part 16 is truly rigid with the sleeve and the part 17 is drivingly rigid therewith but capable of being reciprocated with reference to the part 16. This will be more fully described hereinafter.

For driving the spindle sleeve 13, a worm gear 20 may be keyed onto the sleeve within a hollow housing 6a of the bracket 6 and this may be suitably driven by a worm 21 on a worm shaft 22 supported beneath the worm gear, in suitable bearings, which are in turn supported by the walls of the housing portion 6a, and the shaft may be turned by means of spur gearing 24 (see Fig. 3), one element of which is fast on a shaft 25, shown as extending out of the housing at one side of the machine and carrying fast and loose pulleys 26 and 27. The machine may be driven by a belt B adapted to be shifted by the usual device, indicated generally at 28, from one pulley to the other.

The spindle sleeve 13 is arranged to be intermittently connected to a master control cam drum 30 (see Figs. 1 and 2), one function of which is to feed work to the tap, and another being to reciprocate the spindle shaft 12 to cause the chuck to move toward and away from the tap, as will be shown. The cam has arcuate plates forming the main cam members, there being two of these, designated 31 and 32.

For work feeding, the cam members act, one after the other, on a main control bar 35, shown as extending the entire length of the machine, and slidably carried on the brackets 5, 6 and 8. The control bar has an arm 36 having a cam follower roller 37 at its free end, arranged to engage oppositely disposed end faces of the cams. On a complete rotation of the cam drum, the bar is completely reciprocated once, due to the diagonal arrangement of cam faces, and this reciprocation first withdraws a work feeding bar 68, connected to the control bar by a cross arm 69, from substantially the position shown, with reference to the bracket 8, and thereafter returns the bar. The withdrawal permits work to fall into the path of the inner end of the bar.

For controlling the position of the tool chuck head there is a control bar 40, slidably mounted in the bracket 5 and arranged to be reciprocated by the cam plates to thus reciprocate the spindle shaft 12. The connection between the bar 40 and the drum comprises a roller 41 arranged to engage the end faces of the cams. The bar 40, as shown, is connected to the spindle shaft through a cross arm 43, having its upper end acting between a rigid abutment 44 and a yielding abutment 45, both on the shaft 12.

The cam drum is periodically driven (a single rotation) by the constantly rotating spindle sleeve 13, upon the completion of each tapping operation. A tapping operation consists in the movement of the tap, substantially through a blank in tapping position, and it may be here noted that the completion of a tapping operation occurs when the working end of the tap engages the inner end of the work positioning bar 68 and shifts the control bar 35 to the right, (Fig. 1) past the position at which the cam plate has left the bar at the end of a previous complete rotation of the drum. When the control bar is thus shifted, a conical cam member 56 on the bar acts to raise a clutch trigger 52 slidably mounted on the bracket 6, which trigger controls a suitable clutch to cause it to connect the cam drum with the driving spindle 13. The connections from the cam 56 to the trigger are not fully illustrated, but may be found in the Kelleher patent. The cam acts on a rock arm 55 (Fig. 3) in the way of the cam.

The clutch mechanism and driving connections between the sleeve 13 and drum 30 are as follows: A driving collar 47 is suitably keyed to the spindle sleeve 13 and has clutch teeth or notches, one of which is shown at 48, for engagement by a longitudinally shiftable clutch bar 50, the latter being slidable on a sleeve 50' surrounding the spindle sleeve 13 and connected by suitable gearing 50'' to the drum. The clutch bar 50 is normally held out of engagement with the clutch teeth, by reason of the trigger 52 which is raised and lowered by the above mentioned connections (not shown), between it and the cam 56. It will be assumed that when the cam 56 engages and raises the arm 55, the trigger 52 is also raised. A suitable spring then acts on the bar 50, to push the bar into co-active relation to the clutch teeth, thus causing the sleeve 13 to pick up the sleeve 56 and drive the drum.

It will be seen that in operation, assuming the conduit blank at W is being threaded, and that the working end of the tap is about to cause the release of the trigger 52, by engaging the bar 68 as described, the drum 30 now starts turning, with the following result.

The bar 40 will be moved to the left by engagement of the roller 41 with the cam plate 32, thereby withdrawing the spindle shaft 12 and disengaging the chuck from the tap shank. Following this, the cam 31 will act on the bar 35 to withdraw the work positioning bar 68, so that it may feed a new piece of work to the holder. Subsequently, the cam 32 acts (through the bar 35) causing the return movement of the bar 68 to move the piece of work now at W' to the finish tapping position W, pushing the tap ahead of it (to the left, Fig. 1). Substantially simultaneously the cam 32 comes into position to force the bar 40 to the right, causing the spindle shaft 12 to bring the chuck into engagement with the tap shank.

During the reciprocation of the spindle shaft 12, the driving connection between the member 16 and the member 17 has been maintained and immediately upon reengagement of the tap, the new tapping operation commences. Substantially all the force tending to feed the tap after such reengagement is due to the threaded connection between a held piece of substantially finished work and the tap.

By way of illustrating conventionally a means for holding the work in tapping position against longitudinal movement relative to the holder and also against rotated movement within the holder, I have shown in Fig. 1a a cam bar 120 which may be reciprocated by reason of a pair of fixed collars 121 and 122 on the control bar 35 through suitable lever mechanism, not shown but which is illustrated in the Kelleher patent above referred to. The bar has inclined cam surfaces, one of which is shown at 123, arranged to act on vertically slidable work gripping jaw members 124 (one being shown) having a toothed surface at 125, arranged to engage the pieces of work at W and W1 and hold them against turning as well as longitudinal movement. The jaws are caused to normally stand in their gripping position by reason of suitable springs, one of which is shown at 126 reacting upwardly against an overhanging bracket member 127 on the holder member 7 and downwardly on the jaws. The cam surfaces 123 are so arranged that whenever the cams on the cam drum 30 act to feed new work to the machine, through the work feeding plunger 68, the gripping action of the members 124 will cease, due to their being positively raised by the cam. This permits the work on the tap to be shifted in the holder to make room for the new work as this comes into place.

The driving head 16, as preferably formed, is in the nature of an enlarged drum which has an inwardly extending hub 75 fitting over and threaded to the end of the spindle sleeve 13, which projects from the housing 6a. The interior of the member 16 is formed to provide longitudinal channel-like guideways 76, three being shown. The extreme right hand end of the drum has an annular closure plate 77, preferably bolted thereto, the inner edge of which lies close to the cylindrical outer surface of the chuck head 17. As shown, there is a felt ring 78 interposed between the outer surfaces of the head 17 and the closure plate, this being seated in a suitable peripheral recess in the plate.

The annular member and oil ring completely closes the head to retain lubricant for the rollers to be presently described, and also to keep out dirt. The chuck head 17 is hollowed out for lightness and has a transverse wall 79 at one end, integrally formed with an inner hub 80, tightly embracing the adjacent end of the spindle shaft 12, which is enlarged at 12a, as shown, and to which the hub may be rigidly secured as by a pin 81.

Extending inwardly toward the interior of the member 16, are a series of ears 83, three being shown, which carry rollers 84 riding in the channels 76. The rollers 84 may be made up similarly to a ball bearing, there being outer and inner annular members 85 and 86, each having ball channels for a series of balls 87. Each inner annular member 86 is rigidly secured to its respective ear 83, the securing means, as shown, comprising a stud 88 having a head 89 overlying the member 86, and a flanged enlargement 90 positioned between the member 86 and the ear. The stud is reduced inwardly from the flange 90 and passes through the ear, there being suitable means, such as a cap screw 91 and washer 92 for drawing the flange 90 tightly down onto the outer side of the ear. The head 89 may be formed by riveting over the outer end of the stud.

As shown in Fig. 6, the outside diameter of the rollers is slightly less than the width of the channels 76, hence, all the rollers, assuming these are properly spaced, will simultaneously engage the respective channels at one side only and ride freely thereon.

Beyond the end of the hub 80 of the chuck head 17, the spindle shaft 12 has a channel 126 embraced by a split ring 95 threaded into a chuck member 96. The chuck member contains a hardened chuck element 97 of suitable construction and recessed at its end, as at 97a, to drivingly engage the shank t of the tap T. It is, of course, assumed that the interior surface of the chuck member 97 is substantially complementary to the shank of the tap, so as to prevent relative turning between the member 97 and the tap. Any suitable means may be provided for holding the chuck member 96 against turning with relation to the chuck head, for example, it may be tightly screwed down on the split collar so as to wedge against the hub 80. The member 96 has between its enlarged flange 96a and a spacing collar 98, an arm 99, freely embracing the member 96 and arranged at its upper end to loosely embrace the bar 35, as at 99a. This arm has no co-operative relation to the present invention and is for carrying stripper mechanism to discharge tapped couplings from the shank of the tap on each withdrawal of the chuck from the tap.

If desired, the rollers 84 may be mounted in such manner that they may be individually adjusted in angular relation to each other, substantially about the axis of the head 17, so that, irrespective of inaccuracies in machining the guides 76, the rollers may all be caused to contact simultaneously with their guideways. Suitable adjustment may comprise eccentric sleeves about the studs 88, the sleeves being inserted in the ears in individually adjustable arrangement. For example, as shown in Fig. 4a, each stud may have an eccentric supporting sleeve 100 having rigid therewith a sector-like arm 101 overlying the innermost surface of the ears 83. The sectors are slotted as at 103, for receiving screws 105 to clamp the arms and thereby the sleeves in adjusted position on the ears. By this means, a slight rotational adjustment of the roller axes may be effected to cause the rollers to bear simultaneously on the respective guideways.

It will be understood that the shaft 12 may have clearance within the sleeve 13, which will permit the shaft to be easily slid therein and not detract from the ultimate effect of the roller and guideway connection described.

It will be seen that whenever the chuck is caused to engage the tap, the roller arrangement will provide for the free floating movement of the chuck head with reference to the driving head, and hence, there will be no material drag on the tap threads, such as would ordinarily tend to make the threads back-cut or score the finished threads.

I am aware that at least insofar as the invention is applicable to a tapping machine (of the type shown herein for example) the work holder may be movably mounted, as on rollers, to permit the work to move freely with reference to both the chuck and its driving mechanism, hence except as limited by the prior art, I regard such modification as comprised in my invention. It has been noted that in the machine shown the work does not rotate and the tool does, but this condition may, by obvious modification, be reversed, in which case the chuck 17 or its equivalent would rotate the work holder.

I claim:

1. In work cutting machine wherein there is a holder for work and a holder for a tool to act on the work, the combination of a driving head and means to support the same for rotation but in axially fixed position on the machine, a driving mechanism associated with the head for rotating the same, means associated with the head carrying one of said holders, arranged to be moved longitudinally of the head to permit relative feeding movement between such work and tool, there being a permanent driving connection between said means and head, comprising a series of longitudinally extending ears on said means, radial studs carried by the ears, rollers carried by the studs comprising inner and outer ball races and respectively interposed sets of balls, there being inwardly extending longitudinally extending guideways formed in the driving head in embracing contact with said outer races.

2. In a mechanism of the class described, a driving member, a driven member coaxially supported relative to the driving member, one of said members being mounted for a sliding movement relative to the other of said members, a drum secured to said sliding member, a second drum secured to the other of said members and arranged in a telescopic relation relative to the first named drum, a plurality of anti-friction rollers carried by the first named drum, said rollers being spaced apart from and overlying said driven member, axially extending guideways in the other of said drums, arranged to receive said rollers, and eccentric members disposed between said rollers and their supporting drum, whereby a radial relationship between said rollers may be altered as desired.

3. In a machine of the class described, the combination of a rotatable spindle having a hollow enlarged head drivingly secured thereto, said head having a plurality of circumferentially spaced longitudinally extending guideways, a chuck adapted to enter said head, a driving connection between said head and the chuck comprising a plurality of axially extending ears carried by said chuck, a radial stud carried by each ear, an eccentric sleeve carried by each stud and a roller carried by each sleeve, the rollers being arranged to coact with the guideways of said head, wherein the sleeves may be rotated relative to the chuck to cause the rollers to bear simultaneously on respective guideways.

4. In a machine of the class described, the combination of a rotatable spindle, an enlarged hollow head secured thereto, said head having a plurality of internal longitudinal guideways, a chuck member telescopically arranged relative to said head and adapted to engage a tool, a driving connection between said head and chuck member comprising a plurality of longitudinally extending ears on said chuck member, radial studs carried by said ears, eccentric sleeves surrounding the studs, means to secure one of the sleeves in different positions relative to its corresponding stud, rollers carried by the studs, said rollers comprising inner and outer race members, and balls interposed therebetween and wherein the outer races are in an embracing contact with said guideways.

In testimony whereof, I hereunto affix my signature.

BERNARD P. SCHILTZ.